March 23, 1954
M. D. CANNELL
2,672,693
GAUGING ATTACHMENT FOR TANKS
Filed July 26, 1948
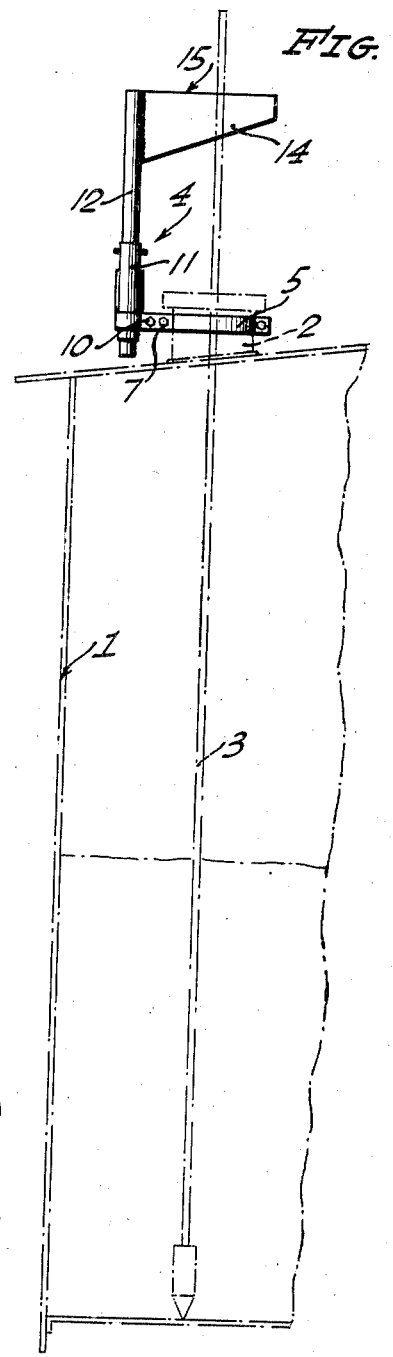
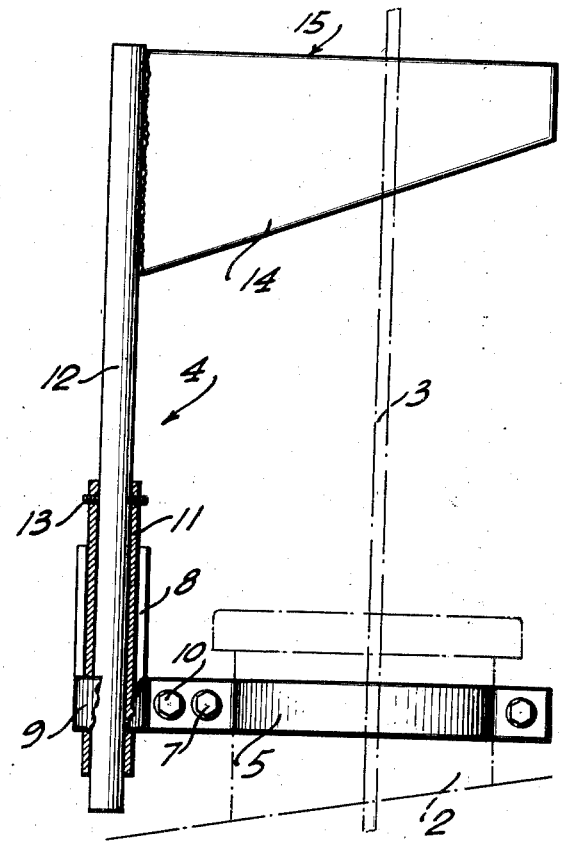
INVENTOR.
MURRAY D. CANNELL.
BY
ATTORNEY Patented Mar. 23, 1954

2,672,693

UNITED STATES PATENT OFFICE 2,672,693

GAUGING ATTACHMENT FOR TANKS

Murray D. Cannell, Wilmington, Calif.

Application July 26, 1948, Serial No. 40,713

2 Claims. (Cl. 33—126.5)

This invention relates to a gauging attachment for tanks containing fluids, and the prime purpose of my invention is to provide an attachment whereby the gauging edge may be so positioned that the measured distance from the gauging edge to the bottom of the tank is uniform for all tanks of the same capacities. Heretofore, tanks varied in the measured distance from the gauge hatch to the bottom of the tank, which is the measured vertical depth of the tank, and this variation was as much as several inches or fractions of an inch, and consequently each tank had to be separately calculated, and the mathematical computations were frequently quite involved.

An object of my invention is to provide a novel gauging attachment which can be quickly and easily attached to the gauging hatch of a tank, and which may be adjusted so that the measured distance from the gauging edge to the bottom of the tank is either a uniform number, or is a whole number, so that the mathematical computations to determine the capacity of a tank is simple.

Another object of my invention is to provide a novel gauging attachment of the character stated which is simple in construction, inexpensive to manufacture, which can be quickly and easily attached to a tank, and which will enable the tank gauger to read his tape with greater ease and facility.

Other objects, advantages and features of invention may appear from the accompanying drawing, the subjoined detailed description, and the appended claims.

In the drawing:

Figure 1 is a side elevation of my gauging attachment in position on a tank.

Figure 2 is a side elevation of my gauging attachment with parts broken away to show interior construction.

Figure 3 is a dissembled view of the mounting clamp.

Referring more particularly to the drawing, the tank 1, preferably containing a fluid, is of usual and well known design and construction, and includes a gauge hatch 2. The tank is gauged through this hatch, all of which is usual and well known in the art. Heretofore, the gauger has dropped the tape 3, into the tank, through the gauge hatch 2, and has observed the reading on the tape at the top of the gauge hatch, which would give him the vertical measured distance from top to bottom of the tank.

The gauge hatch 2, is relatively low and frequently an accurate reading at the top of the gauge hatch was difficult to achieve. My gauging attachment 4 consists of a two piece clamp 5, 6, which encircles the gauge hatch 2, and is bolted around the hatch by suitable bolts 7, thus rigidly securing the clamp in position. The member 6, of the clamp includes a vertical guide member 8, the purpose of which will be further described.

A separate clamp member 9, is fitted between the clamps 5, 6, and is bolted in position by means of the bolt 10. A tube 11, fits between the clamp members 8, 9, and when the bolt 10, is tightened, this tube is held against vertical movement. By loosening the bolt 10, the tube can be adjusted vertically if desired. A pipe or rod 12, extends through the tube 11, and is held against vertical movement by set screws 13. By loosening the set screws 13, the pipe or rod 12, can be adjusted vertically.

A plate 14, is fixedly secured to the pipe or rod 12, adjacent the upper end of said pipe, or rod. The upper edge 15, of the plate 14, is horizontal and is called the gauging edge. The workman measures with his tape 3, to the edge 15, and this edge is so adjusted on the tank 1, that the reading from the edge 15 to the bottom of the tank will be a uniform, or a whole number, that is it will be uniform with other tanks of the same capacity.

The pipe or rod 12, can also be tilted slightly when the set screws 13 are loosened, thus leveling the upper edge 15 of the plate 14 since it is important that this gaging edge shall be horizontal.

Having described my invention, I claim:

1. A gauging attachment for tanks having a gauge hatch and a measuring tape to be lowered through the hatch, said attachment comprising a two piece clamp, each piece being arcuate to partially encircle said hatch, bolts extending through both of the clamp pieces to secure the clamp to the hatch, a tube, means on one end of one of the clamp pieces engaging said tube and releasably clamping the same, a separate clamp means arranged between the clamp pieces and also engaging the tube, a pipe extending vertically through said tube, screws threaded into the tube and engaging the pipe, a rigid gauge plate fixedly attached to the upper end of the pipe and extending at right angles to said pipe, and a horizontal gauging edge on the top of the gauge plate, said gauging edge being the surface upon which a reading of the tape is taken.

2. A gauging attachment for tanks having a gauge hatch and a measuring tape to be lowered through the hatch, said attachment comprising a two piece clamp, each piece being arcuate in shape and partially encircling the hatch, bolts extending through both of the clamp pieces to secure the clamp to the hatch, a vertical guide member on one end of one of the clamp pieces, a tube, said vertical guide member bearing against the tube and releasably clamping the same, a separate clamp member arranged between the clamp pieces, the separate clamp member also engaging the tube, a pipe extending vertically through said tube, screws threaded into the tube and engaging the pipe, a rigid gauge plate fixedly mounted on the upper end of the pipe and extending at right angles thereto, and a horizontal gauging edge on the top of the gauge plate, said gauging edge being the surface upon which a reading of the tape is taken.

MURRAY D. CANNELL.

References Cited in the file of this patent

UNITED STATES PATENTS

| Number | Name | Date |
|---|---|---|
| 694,888 | Pfluger | Mar. 4, 1902 |
| 1,194,746 | Keeler | Aug. 15, 1916 |
| 1,330,142 | Schwartzberg | Feb. 10, 1920 |
| 1,364,053 | Quintin | Dec. 28, 1920 |
| 1,387,363 | De Fore | Aug. 9, 1921 |
| 1,524,377 | Anderson | Jan. 27, 1925 |
| 1,535,396 | Buehler | Apr. 28, 1925 |
| 2,041,332 | Golden | May 19, 1936 |
| 2,282,771 | Wiggins | May 12, 1942 |